(12) United States Patent
Greenfield

(10) Patent No.: US 12,511,900 B2
(45) Date of Patent: Dec. 30, 2025

(54) SYSTEM AND METHOD FOR IMPACT DETECTION AND ANALYSIS

(71) Applicant: ViveSense, Inc., New Rochelle, NY (US)

(72) Inventor: Jules Benjamin Greenfield, New Rochelle, NY (US)

(73) Assignee: ViveSense, Inc., New Rochelle, NY (US)

( * ) Notice: Subject to any disclaimer, the term of this patent is extended or adjusted under 35 U.S.C. 154(b) by 366 days.

(21) Appl. No.: 18/094,215

(22) Filed: Jan. 6, 2023

(65) Prior Publication Data

US 2023/0222795 A1  Jul. 13, 2023

Related U.S. Application Data

(60) Provisional application No. 63/297,550, filed on Jan. 7, 2022.

(51) Int. Cl.
*G06V 20/40* (2022.01)
*G06V 20/52* (2022.01)
(Continued)

(52) U.S. Cl.
CPC .............. *G06V 20/42* (2022.01); *G06V 20/44* (2022.01); *G06V 20/52* (2022.01); *G06V 20/70* (2022.01); *G06V 40/10* (2022.01)

(58) Field of Classification Search
None
See application file for complete search history.

(56) References Cited

U.S. PATENT DOCUMENTS 10,410,328 B1 * 9/2019 Liu .................. G05D 1/0274
2008/0031491 A1 * 2/2008 Ma .................. G06F 18/2433
382/103

(Continued)

OTHER PUBLICATIONS

International Search Report and Written Opinion of the International Searching Authority directed to International Patent Application No. PCT/US23/60319, mailed Apr. 14, 2023; 7 pages.
(Continued)

*Primary Examiner* — Andrew W Bee
*Assistant Examiner* — Christine Zhao
(74) *Attorney, Agent, or Firm* — Sterne, Kessler, Goldstein & Fox P.L.L.C.

(57) ABSTRACT

A system and method for detecting false or exaggerated responses to physical contact. Image capture devices are positioned around a monitored area for capturing still or video images of an activity that include a moment of contact. Those images are synchronized to allow for composite analysis. Then object detection is performed to identify objects of interest within the images. Structural elements of the objects are then identified. Based on the structural elements, a determination is made as to whether a contact was made, for example based on whether structural elements of two nearby objects became adjacent or overlapping with one another, a force is calculated based on a speed of movement of those elements, and then machine learning is used to determine whether a response to contact was within reasonable expectations based on the amount of force and other factors.

19 Claims, 10 Drawing Sheets

(51) Int. Cl.
    *G06V 20/70*    (2022.01)
    *G06V 40/10*    (2022.01)

(56)     References Cited

U.S. PATENT DOCUMENTS

| | | |
|---|---|---|
| 2009/0315978 A1* | 12/2009 | Wurmlin .................. G06T 7/85 |
| | | 348/E13.001 |
| 2016/0018278 A1 | 1/2016 | Jeter, II |
| 2018/0137364 A1 | 5/2018 | Forouhar et al. |
| 2020/0037929 A1* | 2/2020 | Luciano ............... A61B 5/7282 |
| 2020/0327586 A1* | 10/2020 | Miller ................. G06F 16/9535 |
| 2021/0004949 A1* | 1/2021 | Broyda ................ G06V 30/224 |
| 2021/0073524 A1* | 3/2021 | Boyer .................... G06V 10/62 |
| 2024/0005519 A1* | 1/2024 | Adami ................... G06T 7/207 |

OTHER PUBLICATIONS

International Preliminary Report on Patentability directed to International Patent Application No. PCT/US23/60319, issued Jun. 20, 2024; 6 pages.

\* cited by examiner

SYSTEM AND METHOD FOR IMPACT DETECTION AND ANALYSIS

CROSS-REFERENCE TO RELATED APPLICATIONS

This application claims the benefit of U.S. Provisional Application No. 63/297,550, filed Jan. 7, 2022, entitled "System and Method for Impact Detection and Analysis," which is incorporated by reference herein in its entirety.

TECHNICAL FIELD

Embodiments of the present disclosure are related to detecting impact between two moving objects based on image detection and analysis.

BACKGROUND

In sports, flopping refers to intentionally acting as if a foul has occurred when it hasn't. Specifically, many popular sports are considered "contact sports," in which competitors are physically interacting with members of the opposing team. Certain such contact may be prohibited by the rules of the sport. Examples of prohibited contact may include, depending on the sport, pushing, tripping, punching, etc.

In order to gain an unfair advantage during a match, a player may attempt to draw a foul by imitating a reaction consistent with a prohibited contact by the other player. For example, in a soccer match, a player running past or alongside an opposing player may imitate a tripping reaction to make it appear as though they were illegally contacted. This is often supplemented with additional emphatics to attempt to rouse the suspicion of the officials, such as clutching a foot or ankle, rolling around on the ground, and making facial expressions consistent with pain.

Because contest officials are not able to see all areas of the playing field, and often have their view of the play in front of them obstructed by other players, etc., officials are left to "estimate" whether there was an illegal contact based on empirical evidence. This includes the player's reaction and apparent level of discomfort. As a result, players that "flop" are often rewarded with calls in their favor. This not only encourages further flopping, but is highly detrimental to both the fairness and watchability of the game.

BRIEF DESCRIPTION OF THE DRAWINGS/FIGURES

The accompanying drawings are incorporated herein and form a part of the specification.

In the drawings, reference numbers generally indicate identical or similar elements. Additionally, generally, the left-most digit(s) of a reference number identifies the drawing in which the reference number first appears.

DETAILED DESCRIPTION

Provided herein are a method, a system, computer program product embodiments, and/or combinations and subcombinations thereof for detecting collisions based on image analysis.

In sports, flopping refers to intentionally acting as if a foul has occurred when it hasn't. Specifically, many popular sports are considered "contact sports," in which competitors are physically interacting with members of the opposing team. Certain such contact may be prohibited by the rules of the sport. Examples of prohibited contact may include, depending on the sport, pushing, tripping, punching, etc.

In order to gain an unfair advantage during a match, a player may attempt to draw a foul by imitating a reaction consistent with a prohibited contact by the other player. For example, in a soccer match, a player running past or alongside an opposing player may imitate a tripping reaction to make it appear as though they were illegally contacted. This is often supplemented with additional emphatics to attempt to rouse the suspicion of the officials, such as clutching a foot or ankle, rolling around on the ground, and making facial expressions consistent with pain.

Because contest officials are not able to see all areas of the playing field, and often have their view of the play in front of them obstructed by other players, etc., officials are left to "estimate" whether there was an illegal contact based on empirical evidence. This includes the player's reaction and apparent level of discomfort. As a result, players that "flop" are often rewarded with calls in their favor. This not only encourages further flopping, but is highly detrimental to both the fairness and watchability of the game.

Therefore, there is a need in the industry for a system that can accurately determine whether a collision did in fact take place. The present disclosure satisfies this demand. Specifically, as will be discussed in further detail below, the systems and methods disclosed herein provide a mechanism not only for detecting whether a collision occurred, but also whether collision had the necessary characteristics (e.g., force, velocity, momentum, impulse, etc.) to generate the response by the allegedly injured player. In this manner, embodiments of the present disclosure provided assistance to contest officials to allow them to make more informed decisions about the nature of the contact, and whether the player's response to it was justified.

Figure 1:
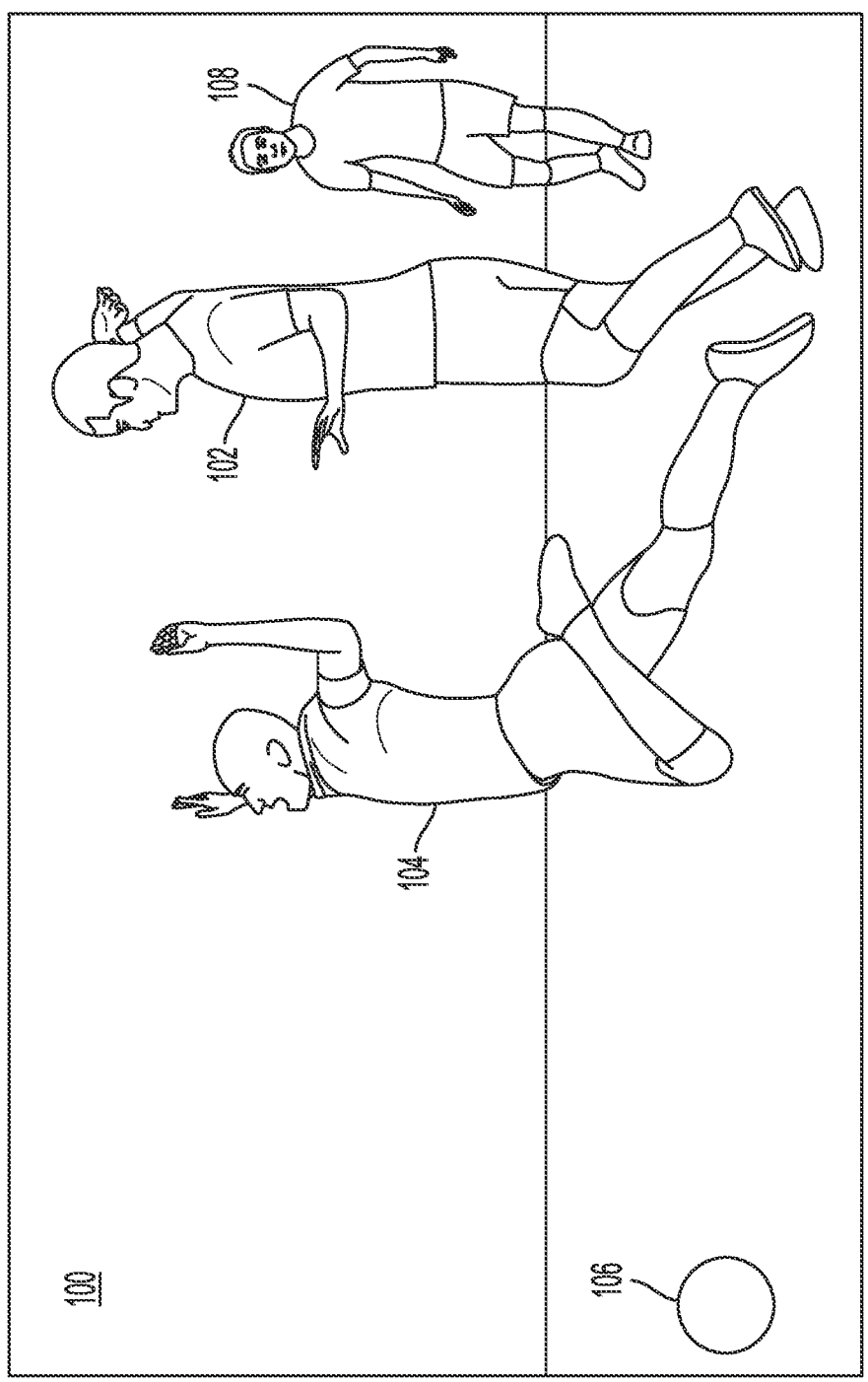
FIG. 1 illustrates an exemplary physical contact scenario according to various embodiments.

FIG. 1 illustrates an exemplary physical contact scenario 100 according to various embodiments of the present disclosure. As shown in FIG. 1, a captured image of a particular content (e.g., a soccer game in the example of FIG. 1) may include several objects, including players 102, 104, and 108, and a ball 106. Depending on the sport or activity being analyzed, other or additional objects may also be present, including but not limited to a net, racquet, club, stick, field markers, debris, etc.

As shown in FIG. 1, during the contest, player 102 may make contact with player 104 or come within the vicinity of player 104. Player 104 is then perceived to experience a large force as a result of that action, whereby player 104 leaves his feet and goes horizontally airborne. Meanwhile, the ball 106 and a background player 108 may also be within the frame of the captured image, even though they are not direct participants in the alleged collision. In the example of FIG. 1, the collision detection system of the present disclosure takes several actions in order to identify whether a collision occurred and the extent of its impact on player 104. This includes object detection in order to identify the various actors, location determination in order to identify the proximity of the various objects to each other and whether any of those objects did indeed come into contact with each other, a force calculate that determines the relative force of the impact between the two players and a reaction estimation that determines whether player 104's reaction to the force was reasonable (e.g., whether it was exaggerated) based on the previous calculations. These and other aspects of the present disclosure will be discussed in further detail below with respect to the drawings.

Figure 2:
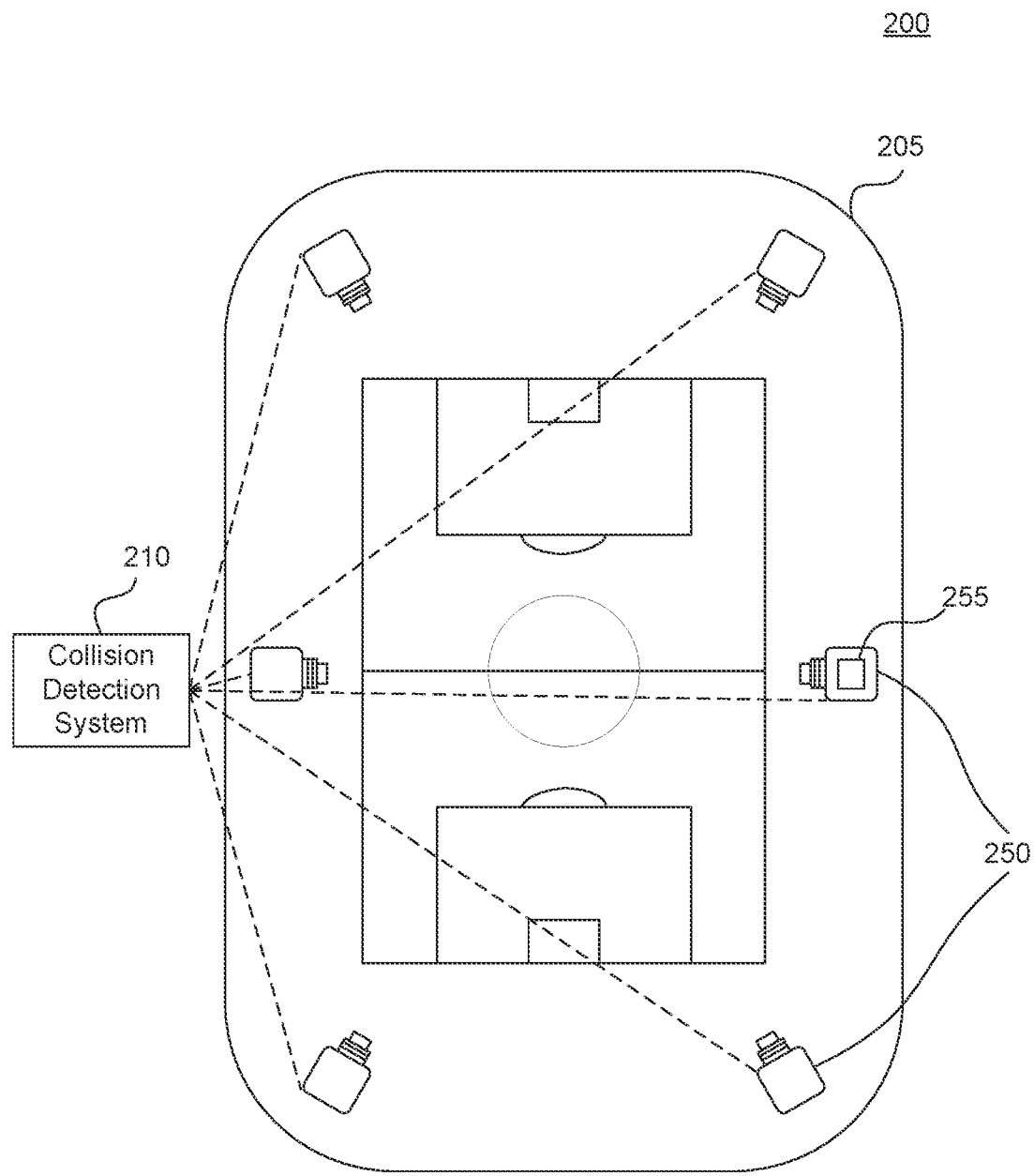
FIG. 2 illustrates an exemplary impact detection system environment configuration according to various embodiments.

FIG. 2 illustrates an exemplary impact detection system environment 200 configuration according to various embodiments. In the example of FIG. 2, the collision detection system 210 is installed at a live sports venue 205, such as a soccer stadium. Other installation locations may include other sports venues, such as a baseball diamond, volleyball court, football stadium, hockey arena, etc. Additionally, the collision detection system 210 may be installed at non-sports venues where contact detection is also important, such as a race track, school grounds, prison facility, daycare center, etc.

Regardless of the installation point, a plurality of image capture devices 250 are installed throughout the venue 205. In embodiments, the image capture devices 250 are positioned within a certain vertical range from the surface being monitored (e.g., the playing field in FIG. 2). In embodiments, a predetermined number of image capture devices 250 are installed about the monitored area. In embodiments, the predetermined number of image capture devices may change depending on a size of the area being monitored or based on a distance from the monitored area that the image capture devices 250 are positioned.

Although not shown, each of the image capture devices includes an image sensor, such as a charge-coupled device (CCD) or an active-pixel sensor (CMOS sensor). These sensors convert light to electrical signals, which is interpreted by an internal processor. The resulting electrical signals are then used to generate an image. In the case of captured video, numerous frames of the video are captured and interpreted in substantially the same manner as a still image, and then linked together in a video format to generate video data.

Each of the image capture devices 250 captures images of the monitored area from their respective perspectives. In embodiments, the images are frames of a video image captured in a video format, such as MP4, WMV, FLV, etc. In other embodiments, the captured images are a series of still images, recorded in an image format, such as JPEG, GIF, PNG, etc. In different embodiments, the images may be captured and stored locally at the image capture devices and forwarded to the collision detection system 210 in batches, or can be recorded and streamed in real-time to the collision detection system. In an embodiment, each of the image capture devices includes some communication interface 255 for communicating with the collision detection system.

The collision detection system 210 receives the captured image data from the various image capture devices. Using various techniques, the collision detection system 210 aligns the received data in time and performs collision analysis on the aligned images. These and other aspects will be described in further detail below.

Figure 3:
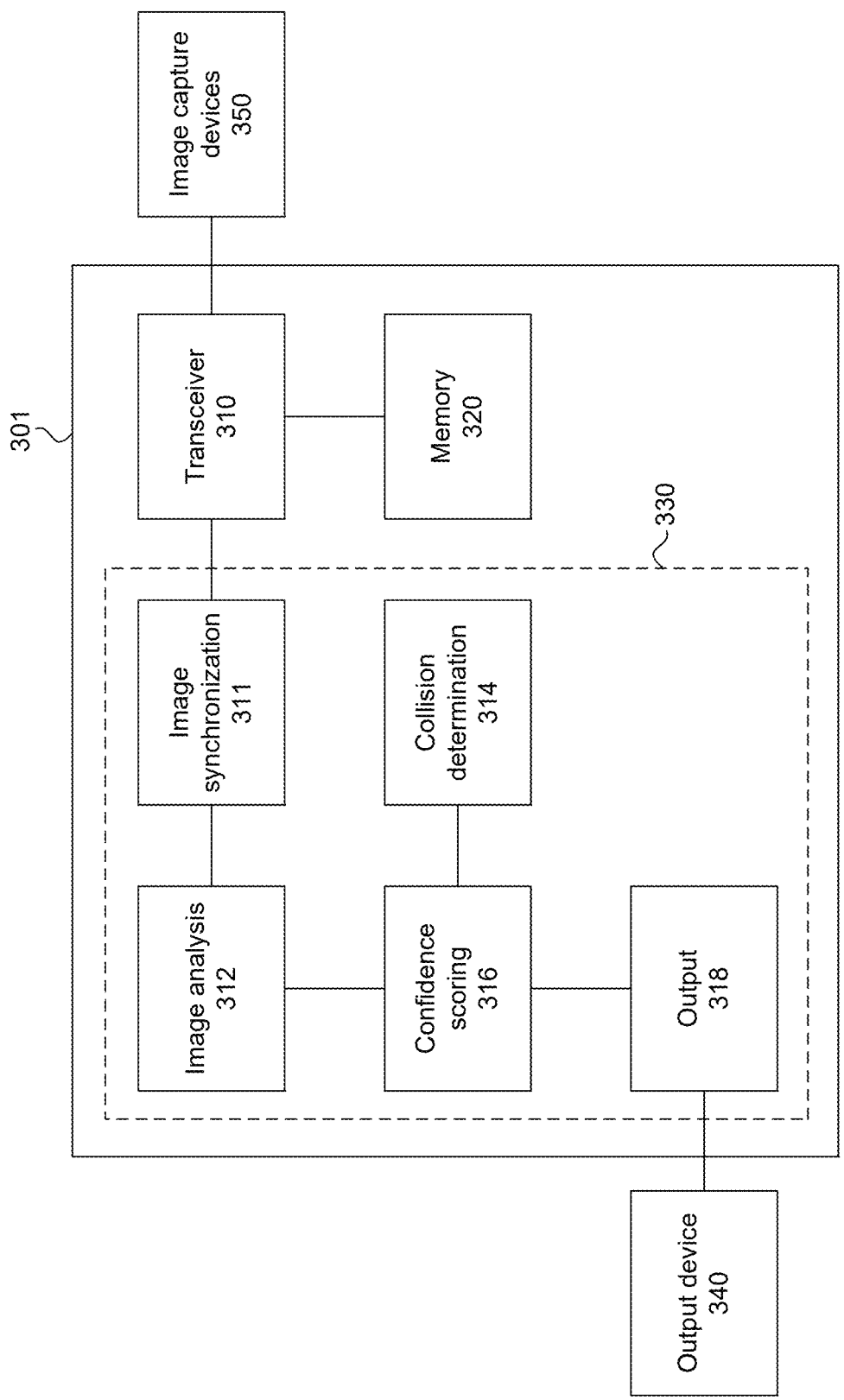
FIG. 3 illustrates a block diagram of an exemplary collision detection system according to various embodiments.

FIG. 3 illustrates a block diagram of an exemplary collision detection system according to various embodiments. As shown in FIG. 3, a collision detection system 301 is in communication with a number of image capture devices 350. The collision detection system 301 includes a transceiver 310, a memory 320, and a processor and may represent an exemplary embodiment of collision detection system 210. Meanwhile, image capture device 350 may represent an exemplary embodiment of image capture devices 250.

As shown in FIG. 3, the collision detection system includes a transceiver 310 for communicating with the image capture devices 350. In an embodiment, the transceiver receives the video images from the image capture devices 350 and transmits control signals to the various image capture devices 350 that may include start and stop instructions, synchronization clock information, etc. The transceiver 310 forwards the received images to the memory 320, where the video images are stored for analysis. The memory 320 is any suitable digital storage device capable of storing an amount of data sufficient to analyze the received data, such as a hard disk drive, a solid state memory or other suitable memory. In an embodiment, the memory 320 is a FIFO (First-In-First-Out) storage that temporarily stores the images for analysis. Once the analysis of the images is complete, the images are sent via the transceiver 310 or another mechanism to an off-site long-term storage unit having higher capacity and capable of storing larger amounts of data.

The processor 330 receives image data of the various image capture device 350 from the memory 320 for analysis. In an embodiment, the processor 330 is a hardware processor configured to execute computer instructions stored in the memory 320. Although only a single processor 330 is shown, it should be understood that multiple processors 330 may also be used. The processor 330 includes a number of functional blocks configured to carry out different steps of the collision analysis.

For example, as shown in FIG. 3, the processor 330 includes an image synchronization block 311 configured to synchronize the received images. As discussed above, video images are received from several different image capture devices and these images must be synchronized for analysis. In other words, the collision detection system 301 must ensure that multiple images from different image capture device 350 depict a same moment in time so that those images can be collectively analyzed. In embodiments, synchronization can be performed using a universal synchronized clock distributed throughout the system and specifically to the various image capture devices. Using this synchronized global clock, the image capture devices 350 may encode metadata of the video frames with a timestamp associated with the synchronized global clock to identify a precise moment in time when the image was captured. Other synchronization methods may be available as will be understood by those of skill in the art.

Using the synchronization information, the image synchronization block 311 is able to synchronize the received video data so that the collision detection system 301 can analyze all available angles together in making a collision determination.

The synchronized image data is then provided to an image analysis block 312. The image analysis block 312 performs several functions on the synchronized image data in order to prepare for the collision determination. Specifically, in an embodiment, the image analysis block 312 detects a plane of the monitored area (e.g., the playing surface), performs object detection, body identification, joint detection, body modeling, contact detection, force calculation, and response analysis. These analysis steps are discussed in further detail below with respect to FIG. 4.

Based on the analyzed images, a collision determination block 314 determines whether a collision has occurred and whether the response to that collision was a reasonable/expected one. A confidence scoring block 316 then determines a confidence score associated with the determination. In an embodiment, the confidence score is a number within a predetermined range, such as a numeral within the range 1-10 or 1-100. The confidence scoring block 316 makes its confidence scoring calculation based on a number of factors, such as whether a force at a bottom range to cause the resulting reaction, or whether the force was significantly above a threshold floor. The confidence score is similarly calculated based on other calculations are slightly below, at, above, or significantly above their determination thresholds. Other calculations that may affect the confidence score include, but are not limited to force angle, response analysis, body part being contacted, body part performing the contacting, etc.

The collision determination result and the confidence score are then provided to an output block 318. The output block 318 then outputs the data to a user for review. In an embodiment, the data is repackaged in a user-friendly form for consumption by a reviewer. This may include indicating whether a foul was likely committed, which foul was likely committed, the location of the foul or connect and the players involved, a snippet of the relevant video evidence supporting the collision determination, and/or the confidence score, among other information.

In an embodiment, the output 318 also provides the reviewer with a user interface that includes controls for allowing the reviewer to conduct their own research. The replay system may be configured to generate a replay of the incident based on the video captured by the camera system, and to display the replay on a display device or transmit it to a remote location for review. This may include video controls for allowing the reviewer to review the video evidence. Such controls may allow the reviewer to advance, reverse, slow, zoom, and pause the video. In this manner, not only is the reviewer provided with the system's determination as to whether contact occurred and the response was reasonable, but the reviewer may also confirm this understanding for themselves to arrive at an accurate determination. In an embodiment, the video includes annotations indicating the moment of force, the location of force, the amount of force, etc., and may include a legend to provide context to the reviewer. For example, the force may be annotated in the video as "50N" at the moment of force, with a legend indicating that 50+ Newtons is generally insufficient force to knock over an athlete of a certain weight.

The output device 340 may include any output means sufficient to provide the reviewer with the information needed to make an informed decision regarding whether a foul occurred. In embodiments, the output device 340 may include one or more of a display screen, an audio output device (such as a speaker), as well as one or more input devices for controlling the information output to the output device, such as a mouse, keyboard, microphone, etc. For example, the system may be configured to update a scoreboard in real-time to reflect the score of the sporting event, or to trigger a display or sound system to indicate a foul or contact.

Figure 4:
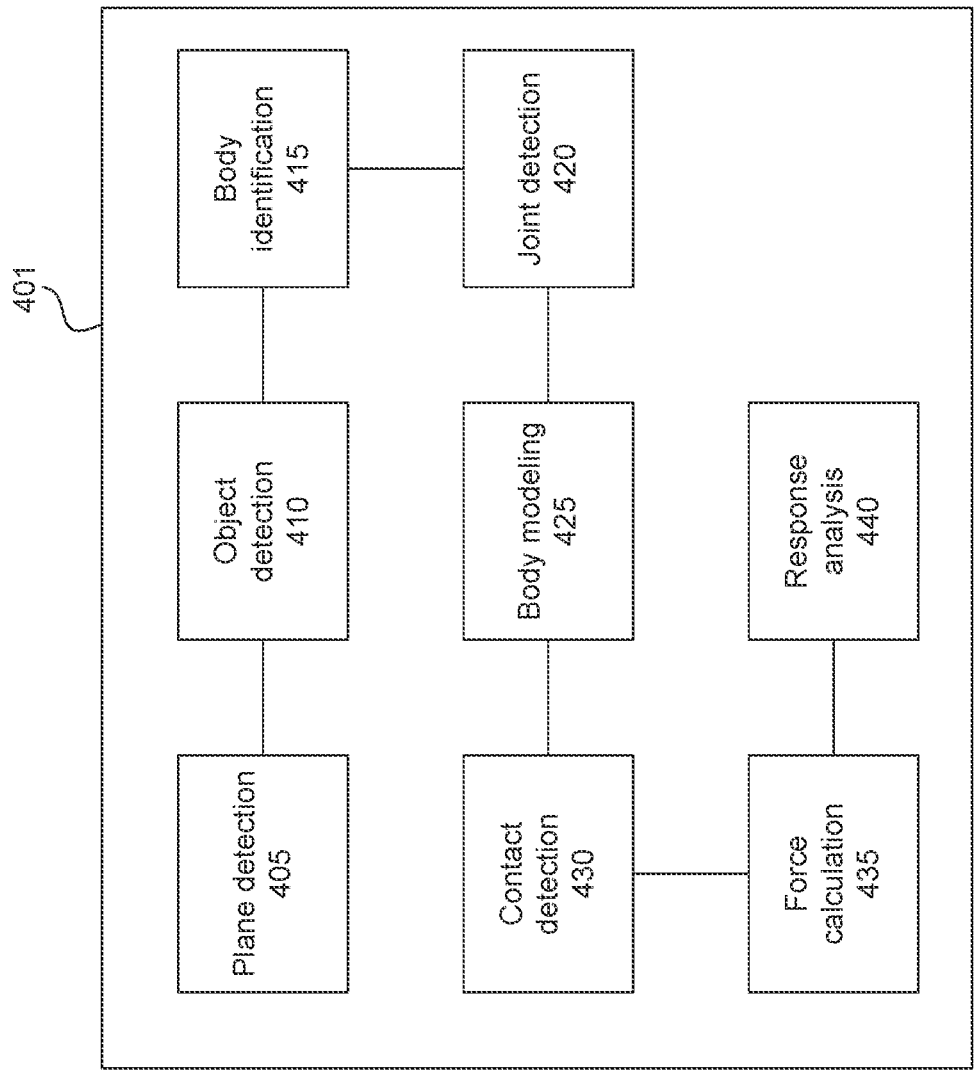
FIG. 4 illustrates a functional block diagram of an exemplary image analysis and processing block of the collision detection system according to various embodiments.

FIG. 4 illustrates a functional block diagram of an exemplary image analysis and processing block 401 of the collision detection system according to various embodiments. The image analysis and processing block 401 includes a plane detection block 405, an object detection block 410, a body identification block 415, a joint detection block 420, a body modeling block 425, a contact detection block 430, a force calculation block 435, and a response analysis block 440, and may represent an exemplary embodiment of the image analysis block 312.

The image analysis and processing block 401 receives the synchronized image data from the image synchronization block 311. From the synchronized image data, the plane detection block 405 first identifies a plane of activity. In different embodiments, this may be a playing field or other playing surface, a floor of a monitored area, a roadway, etc.—any surface on which the activity is to be monitored. In an embodiment, the plane is predefined during initial setup of the collision detection system. In this regard, each image capture device may be configured with knowledge of the boundaries of the monitored plane, or the plane detection block 405 can be configured with information as to a location of the monitored surface relative to the image capture devices. Alternatively, the collision detection system (e.g., the plane detection block 405) uses visual markers located at or near the plane in order to detect the metes and bounds of the plane. These markers may include field or court lines, corner markers such as corner flags or turnbuckles, walls, objects with known locations such as baskets or goals, etc. With these markers and/or the preconfigured planar calibration information, the plane detection block 405 identified a location of the plane on which the monitored activity is taking place. This will serve as a reference plane for further calculations, including determining a vertical position of the actors and objects.

Once the plane has been detected, an object detection block 410 analyzes the images to perform object detection. In an embodiment, the object detection block 410 may be trained with a machine learning algorithm to recognize various objects, such as human bodies, sport equipment such as sticks, balls, etc., and as well as other objects that may be expected to be found in the monitored area. The model may be trained using a variety of techniques, including supervised learning, unsupervised learning, and reinforcement learning. In an embodiment, the object detection block 410 can identify and track individual players. This can occur, for example, by using optical character recognition (OCR) or other recognition techniques to match a jersey number and/or jersey still with a corresponding player name. In another embodiment, players can be manually identified to the system by a user. The collision detection system 301 stores and maintains the association between the individual and the identification and can track the two throughout monitoring.

Based on the object detection, a body identification 415 identifies human bodies from among the detected objects. In some embodiments, body identification 415 may be tuned to identify a different object of interest. However, for purposes of this explanation, it will be presumed that the system seeks to track collisions between human bodies. Therefore, the body identification 415 identifies one or more human bodies from among the detected objects. As with object detection 410, this can be performed based on a machine learning algorithm trained to recognize bodily shapes and conditions, pattern matching, etc. The model may be trained using a variety of techniques, including supervised learning, unsupervised learning, and reinforcement learning. In embodiments, the joint detection block 420 classifies each body part, such as a head, torso, legs, arms, etc. In embodiments, the system may identify and track body parts over multiple video frames.

Once the bodies have been identified, joint detection block 420 maps the shapes of the detected bodies in order to assign structures thereto. In other words, joint detection 420 identifies joints and skeletal structures associated with the detected bodies. This is shown, for example, in FIG. 5A, which illustrates an example of the analytical step of the image analysis process carried out by the collision detection system according to various embodiments. In some embodiments, players may be outfitted with digital position sensors to assist with body detection. In some embodiments, the sensors are affixed or embedded within their clothing or equipment.

Figure 5A:
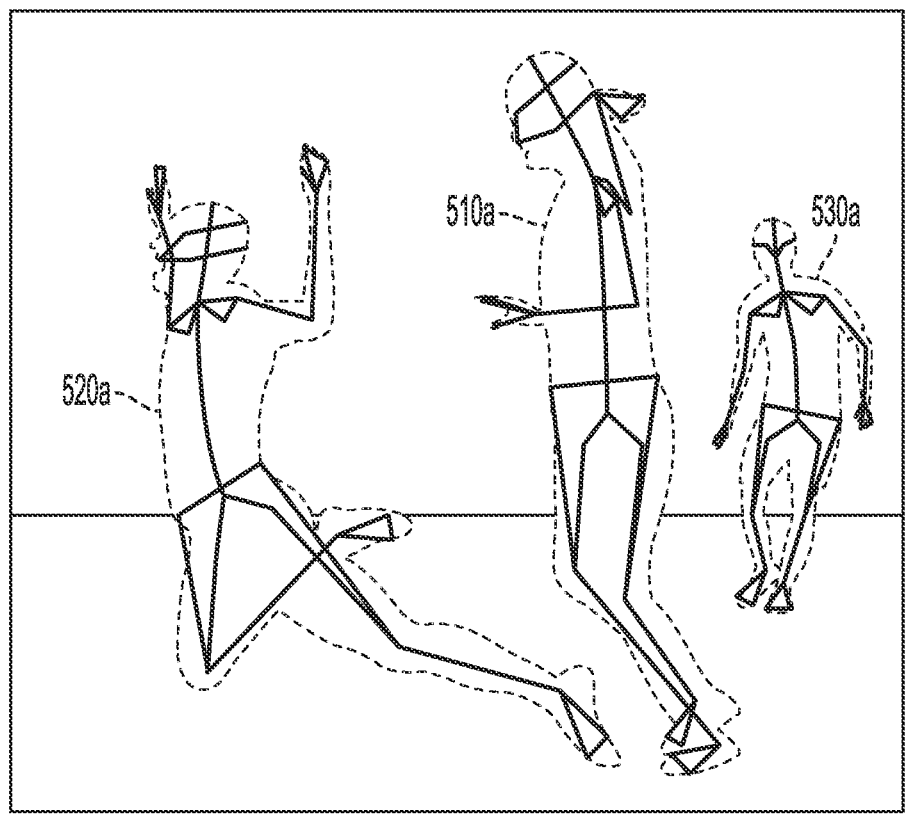
FIGS. 5A-5C illustrate various analytical steps of the image analysis process carried out by the collision detection system according to various embodiments.

As shown in FIG. 5A, the detected human bodies in the captured image data are analyzed and their structures estimated. As a result of three individuals being detected 510a, 520a, and 530a being detected by the objection detection block 410 and body identification block 415, the joint detection 420 estimates a skeletal structure for each of those bodies, which will aid in force detection and analysis. Notably, in order to accurately determine the locations of the players within the monitored area, more than one camera must be used, or the camera may employ methods such as thermal imaging or LiDAR to capture image depth.

A body modeling block 425 then models a human body from the structure estimated in the joint detection block 420. In other words, the body modeling block 425 estimates, based on the detected skeletal structure, a body outline associated with the detected human body. In different embodiments, the body can be modeled entirely based on the detected skeletal structure using known weight and density distributions of the different players or statistical averages known and/or trained to the body modeling block 425, or the body modeling 425 can refer to the original image to assist with determining a body structure.

Figure 5B:
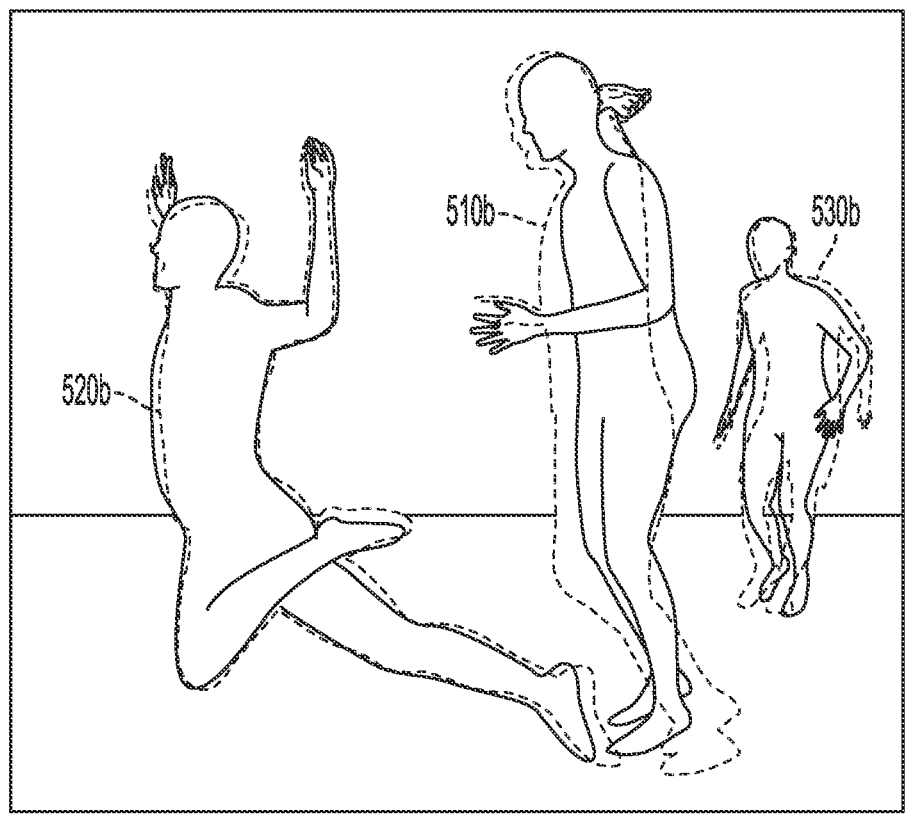

This is shown for example in FIG. 5B, where the skeletal structures of FIG. 5A have been replaced or supplemented with the estimated body outlines of the various individuals 520a, 520b, and 520c.

The contact detection block 430 next uses the body estimations to determine whether a contact between two players occurred. In one embodiment, this determination can be made on a frame-by-frame basis. In this instance, each frame is analyzed to determine whether any part of any one of the detected bodies overlaps, intersects, or is immediately adjacent to any one part of any of the other detected bodies. When this occurs, the contact detection block 430 determines that a contact has occurred. In another embodiment, the contact determination is made based on an analysis of multiple consecutive frames. In this embodiment, the movement of the various joints can also be taken into consideration. For example, a movement of a joint towards another body that is eventually detected as "contacting" the other body would raise the likelihood of a contact being detected. On the other hand, even if a joint is detected as appearing to "contact" another body, if the motion of the joint is away from the body, then a the likelihood of a contact having occurred is reduced. In some embodiments, the contact detection block 430 may identify a specific motion (e.g., throwing, kicking, punching, etc.) to assist with the analysis. The identified motion may be identified from a combination of movements.

In another embodiment, the contact detection block 430 identifies a contact based on an abrupt change in motion of one or more bodies or body parts. This can be performed based on an analysis of consecutive video images. Additionally, actual motion of a particular body part can be compared to an expected motion of that body part based on a previous direction, angle of movement, momentum, linear and/or angular velocity, and other aspects of the movement, such as excessive movement of the limbs. This can be done, for example, using the following approximations:

$$m_1 v_{1ix} + m_2 v_{2ix} = m_1 v_{1fx} + m_2 v_{2fx} \tag{1}$$

$$m_1 v_{1ix} + m_2 v_{2ix} = m_1 v_{1fx} + m_2 v_{2fx} \tag{2}$$

which give:

$$m_1 v_{1i} = m_1 v_{1f} \cos\alpha_1 + m_2 v_{2f} \cos\alpha_2; \text{ and} \tag{3}$$

$$0 = m_1 v_{1f} \sin\alpha_1 + m_2 v_{2f} \sin\alpha_2 \tag{4}$$

Furthermore, $$0.5 * m_1 v_{1i}^2 = 0.5 * m_1 v_{1f}^2 + 0.5 * m_2 v_{2f}^2 \tag{5}$$

Where $\alpha$ is the change in direction for each of the two people compared to before the sudden change. If the momentum of the person who fell is greater than the momentum of the person nearest before the fall, the system may present an alert or send a signal to a referee. In embodiments, the system further calculates a change in momentum, as well as whether any force was absorbed by protective equipment, and compares this information to physical stress or stretch limits or known injury force limits to determine a risk/probability of injury. Alerts may be sent via any suitable network to any suitable client device of the referee (e.g., smart phone, etc.). The system may also provide an assessment score including the confidence of the calculation.

The results of the contact detection block 430 are forwarded to the force calculation block 435. The force calculation block 435 analyzes a plurality of consecutive video frames immediately prior to and including the moment of contact. By examining the multiple frames, the force calculation block 435 can measure the speed at which the contacting joint was moving prior to making contact. This is performed by tracking a distance that the joint travels between successive frames. The distance is known based on the dimensions of the monitored plane and a distance of the monitored objects from the image capture devices.

From the calculated speed of the joint, a force of the joint can then be determined from an estimated mass of the individual to whom the joint belongs. This calculation is scalable in complexity. Specifically, to obtain more accurate force calculations the movement of other joints of the contacting body can also be measured, and their relative impact on the force exerted by factored in.

Once the force has been calculated, a response analysis block 440 analyzes whether a response of the contacted individual is within a reasonable/expected range. In an embodiment, the response analysis block 440 analyzes the video frames at and immediately following a point of impact. However, in some embodiments it may also be useful to analyze video frames prior to a moment of contact, since "flops" often begin prior to any contact taking place. In this block, the movement of the contacted individual is analyzed following the supposed moment of contact. In an embodiment, the response analysis block 440 includes a machine-learning algorithm trained with examples of accurate/reasonable and falsified/embellished/unreasonable reactions to physical contact. Using this machine-learning algorithm, the response analysis block 440 analyzes the movement of the contacted individual following the moment of contact, and makes a determination as to whether the movement was reasonable or unreasonable. In an embodiment, this analysis may also be supplemented with an analysis of the contact individual's body motion to determine whether the contacted individual "assisted" with the response (e.g., whether the contacted individual used the force of their own body to embellish the response— e.g., flopped).

Figure 5C:
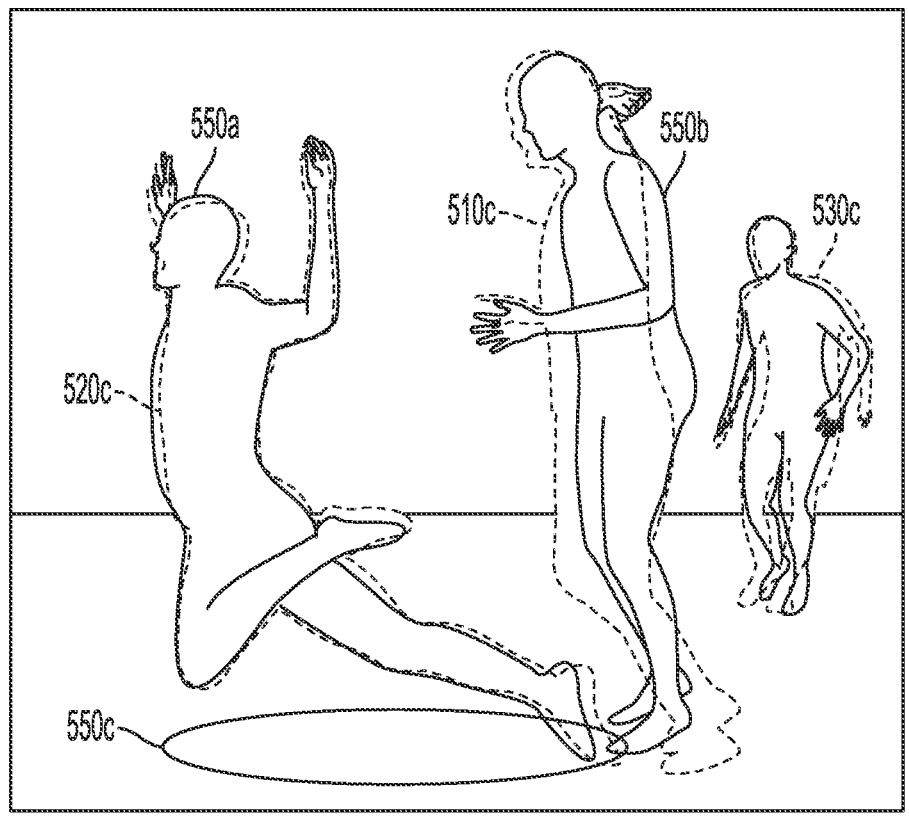

As discussed above with respect to FIG. 3, the image analysis results are then output to the additional analytical functions of the collision detection system 301, including the collision determination 314, the confidence scoring 316, and the output 318. As discussed above, the output 318 may add or overlay various details to the output images to assist the reviewer with making a determination. This is shown for example in FIG. 5c, where notable ones of the different detected bodies are supplemented with various tags, labels, or other indicators. As shown in FIG. 5c, individual 520c has been labeled with a tag 550a as a "non-locomotor", whereas individual 510c has been labeled with a tag 550b as a "locomotor". Additionally, individual 520c has been labeled with an indicator 550c to show that the individual is off the plane of monitoring (e.g., airborne). These and other labels or annotations can be used by the output 318 to enhance the review experience and improve result accuracy.

In various embodiments, the system may perform image analysis as described above, and also augment the image analysis data with sensor data. For example, when the system determines characteristics of objects, or compares momentums, the system may augment and corroborate any data derived from image analysis with collected sensor data. In embodiments, the sensors may include Internet of Things (IoT) sensors, accelerometers, position sensors, etc. These sensors may be located within player equipment, such as helmet, and may be used for various purposes, such as 3D plane rendering, force detection, momentum changes, etc.

Figure 6:
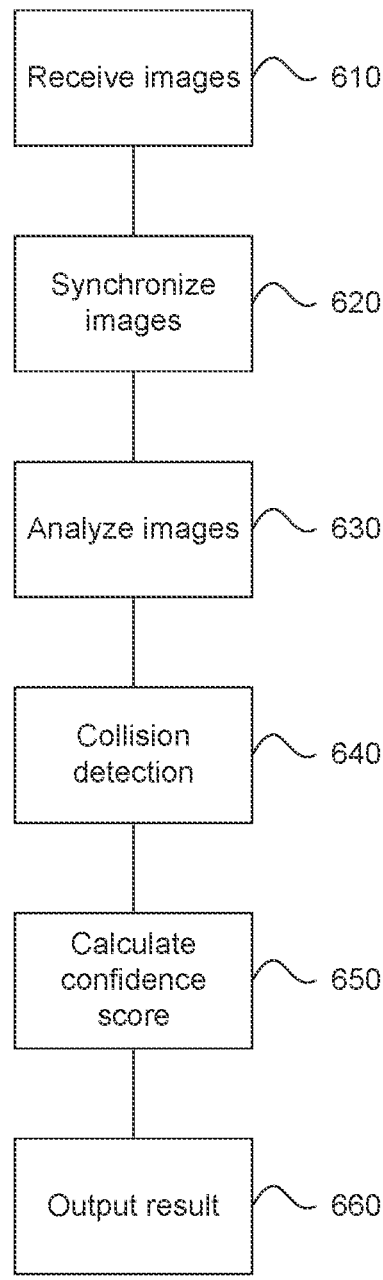
FIG. 6 illustrates a flowchart diagram of an exemplary method for detecting a collision according to various embodiments.

FIG. 6 illustrates a flowchart diagram of an exemplary method 600 for detecting a collision according to various embodiments. A shown in FIG. 6, the method 600 begins by receiving the images in step 610 from the various image capture devices positioned throughout the monitored area. As discussed above, in various embodiments, these images may include still images or frames of a video image.

In step 620, the receives images are synchronized such that they are aligned in time. As discussed above, in various embodiments, this may involve timestamping the images according to a synchronized global clock, and aligning the images according to their timestamps.

In step 630, the images are analyzed. As discussed above with respect to FIG. 4, this can involve numerous analytical steps including but not limited to detecting a monitored plane of activity, detecting objects within the images, identifying human bodies (or other objects of interest) from among the detected objects, detecting joints or another bodily structure associated with the detected bodies, estimating a body composition of the detected bodies, detecting an actual physical contact between two different individuals, calculating a force associated with that contact, and analyzing a response to the force by the contacted individual.

In step 640, a collision detection 640 takes place. In this step, based on all the previous calculations and analyses, a determination is made as to whether a collision occurred that warranted the response from the contact individual. In other words, the collision detection step 640 determines (in the context of flopping application) whether a player flopped.

In step 650, a composite confidence score 650 is determined for the collision determination. In embodiments, this determination is made based on additional data provided by the various analyses, including whether various decisions were based on numbers that fell on a lower range of expected values or a higher range of expected values. Alternatively, as discussed above, each of the different analysis steps can calculate their own confidences based on various factors including whether a determining value was at a higher or lower end of an range. The confidence scoring step 650 then calculates the overall confidence score based on a combination of the individual analysis scores.

In step 660, the resulting determination as well as any additional information relative to the reviewer is output to the reviewer, this can include the images that were analyzed, the originating video stream, annotations overlaid on the output images, confidence scores, etc.

Figure 7:
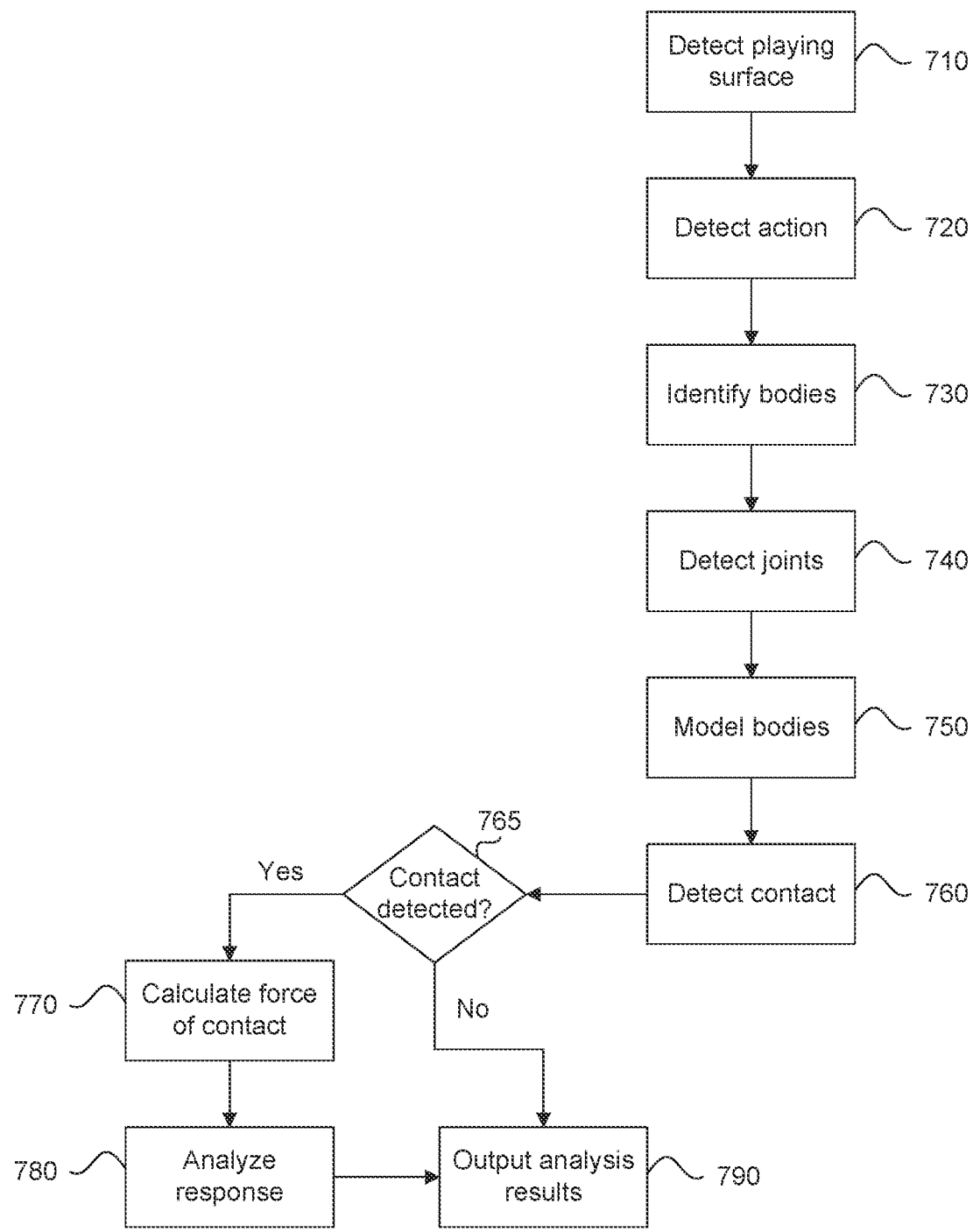
FIG. 7 illustrates a flowchart diagram of an exemplary method for analyzing images of a potential collision according to various embodiments.

FIG. 7 illustrates a flowchart diagram of an exemplary method 700 for analyzing images of a potential collision according to various embodiments. As shown in FIG. 7, the method 700 begins at step 710, with the detection of a plane of activity (e.g., a playing surface). As discussed above, this can be predefined based on the locations of the image capture devices relative to the monitored area, or can be determined from the images based on known markers or other evidence.

In step 720, actors or objects are detected within the images. In embodiments, objects are detected using one or more machine learning algorithms for recognizing different objects, such as human bodies, sport equipment, and others. In embodiments, the object detection step 720 can include identifying/tracking certain objects, such as individual players. This determination can be based on physical characteristics, such as jersey number, jersey type, or physical features, among others, or can be manually identified to the system by a user.

In step 730, human bodies are detected from among the detected objects. As with the object detection in step 720, this can be performed using machine learning techniques trained to recognize bodily features. However, it is contemplated that other identification techniques be used, including pattern matching, manual identification, etc. Further, although the present embodiment refers to the detection of human bodies, it should be understood that other objects could instead be detected. In embodiments, as part of the body detection, specific body parts of interest can be identified, such as head, elbow, legs, etc., and these specific body parts tracked throughout the analysis.

In step 740, a structure of the object is detected. For example, in the context of human bodies, one or more joints, limbs, or other structural features could be detected. This provides a structural estimation of the actors being analyzed. In an embodiment, one or more images being analyzed can be annotated with the structural elements.

In step 750, a physical estimation of the bodies are modeled based on the detected structural elements. In embodiments, this involves estimating a body outline associated with the detected human body based on the detected structural elements. In different embodiments, the body can be modeled based on the structure alone, or can be supplemented using known body composition or other physical attributes of the detected individuals, or based on statistical averages stored in memory.

In step 760, contact detection is performed in which a determination is made as to whether two or more of the detected bodies or other objects collided. In different embodiments, this determination can be made based on one or more consecutive frames, considering the locations of the joints alone considering the movement of the different joints or other body parts.

In step 765, a determination is made as to whether contact was detected. If the contact detection step 760 determined that contact did not occur (765—No), then the result is output in step 790 to further processing steps of the collision detection system 301.

Alternatively, if the contact detection step 760 determined that a contact did occur (765—Yes), then the method 700 proceeds to step 770, where the force of the contact is calculated. In embodiments, the force calculation measures a speed at which at least one of the contacting joint or the contacted joint was moving at the time of contact. In embodiments, the mass of the bodies or certain body parts are also considered. In further embodiments, analysis of other joints separate from the contacting joint are also considered. Analyzing the movement of additional joints can show whether the contacting individual used the kinetics of their full body during the contact.

In step 780, a response of the contacted individual is analyzed. In embodiments, this can involve an analysis of the frames immediately following and including the moment of contact to assess, but can also include frames immediately preceding the moment of contact. In embodiments, machine learning can be used to determine whether the bodily response of the contacted individual is within a reasonable or expected range of expected results based on the contact and the force, as well as other factors, such as a speed at which the players are moving prior to contact, etc.

In step 790, the results of the analysis are output. In embodiments, the output can include one or more of the determination of whether a contact occurred, whether a response to the contact was reasonable, a force of the contact, as well as one or more confidence scores associated with the determination. In embodiments, each step of the analysis determines its own confidence score as to the accuracy of it assessments. These scores can be based on where the results fall within a range of values, based on the accuracy or expected accuracy of the data available (such as clear or blurry images), etc. In an embodiment, each of the confidence scores are output. In other embodiments, a composite score is calculated from the individual confidence scores.

Of course, several modifications may be available in the above methods. For example, rather than detecting joints or other structural elements, the methods can construct a physical model based directly from the available images. Further, several additional factors can weigh into the various decisions, including the locations of other objects, lines of sight, estimated objectives by the various actors, etc. These and other modifications will be available to those of skill in the art. Additionally, although the above has been described primarily as an assistance system to help with a review of particular play, the system could alternative take an active role in assessing plays in real-time, and provide alerts or statuses to officials.

Figure 8:
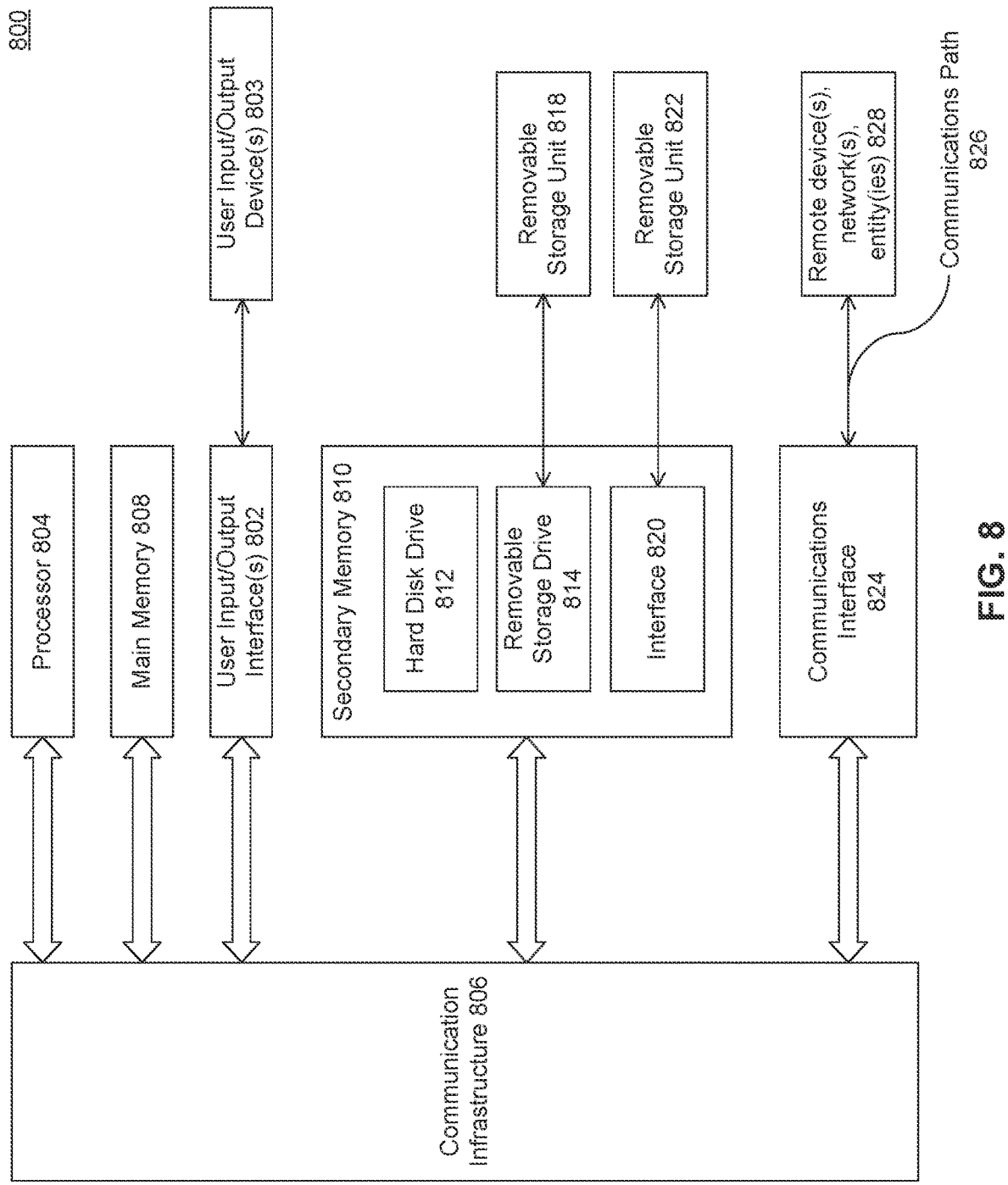
FIG. 8 illustrates an exemplary computer system for implementing some aspects of the disclosure or portion(s) thereof.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A monitoring system, comprising:
a plurality of image capture devices distributed about a monitored area, each of the plurality of image capture devices configured to capture video data of the monitored area; and
a collision detection system including:
a transceiver configured to receive the captured video data from the plurality of image capture devices; and
one or more processors configured to:
detect objects in the video data;
identify, from among the detected objects, a first object of a predetermined type and a second object of the predetermined type;
first determine from the video data whether an incident involving the first object and the second object included a collision;
perform an analysis of a response of the first object to the incident, the analysis including calculating a force associated with a motion of the second object;
second determine based on the first determining and the analysis whether the response was beyond what would be normal or expected based on the calculated force; and
generating an output to a reviewer by adding or overlaying various details to output images indicating whether there was contact, an amount of the force, results of the second determining, and a confidence score associated with the second determining.

2. The monitoring system of claim 1, wherein the one or more processors are further configured to synchronize the received video data based on metadata included in the video data.

3. The monitoring system of claim 2, wherein the metadata includes timestamps generated from a synchronized global clock.

4. The monitoring system of claim 1, wherein the one or more processors are further configured to detect a surface of the monitored area.

5. The monitoring system of claim 4, wherein the surface is detected based on known positions of predetermined objects in the monitored area.

6. The monitoring system of claim 1, wherein the first object and the second object are human bodies.

7. The monitoring system of claim 1, wherein at least one of the detecting, the identifying, the first determining, the analysis, and the second determining is performed by a machine-learning algorithm.

8. A method for monitoring a monitored area, comprising:
receiving a plurality of video data feeds from a plurality of image capture devices;
detecting objects in the plurality of video data feeds;
identifying, from among the detected objects, a first object of a predetermined type and a second object of the predetermined type;
first determining from the plurality of video data feeds whether an incident involving the first object and the second object included a collision;
analyzing a response of the first object to the incident, the analysis including calculating a force associated with a motion of the second object;
second determining based on the first determining and the analysis whether the response was beyond what would be normal or expected based on the calculated force; and
generating an output to a reviewer by adding or overlaying various details to output images indicating whether there was contact, an amount of the force, results of the second determining, and a confidence score associated with the second determining.

9. The method of claim 8, further comprising synchronizing the received video data feeds based on metadata included in the video data feeds.

10. The method of claim 9, wherein the metadata includes timestamps generated from a synchronized global clock.

11. The method of claim 8, further comprising detecting a surface of the monitored area.

12. The method of claim 11, wherein the surface is detected based on known positions of predetermined objects in the monitored area.

13. The method of claim 8, wherein the first object and the second object are human bodies.

14. The method of claim 8, wherein at least one of the detecting, the identifying, the first determining, the analyzing, and the second determining is performed by a machine-learning algorithm.

15. A method of monitoring an area, comprising:
receiving video data from a video capture device;
performing object identification on the received video data to identify a plurality of objects;
identifying a first human body and a second human body from among the plurality of objects;
identifying a body part of the first human body;
calculating a force of the body part at a time of an incident;
first determining whether the body part of the first human body collided with the second human body;
measuring a response of the second human body to the incident;
second determining based on the first determining, the calculated force, and the measuring, whether the response was beyond what would be normal or expected based on the calculated force; and
generating an output to a reviewer by adding or overlaying various details to output images indicating whether there was contact, an amount of the force, and results of the second determining.

16. The method of claim 15, further comprising calculating a confidence score associated with the second determining.

17. The method of claim 16, wherein the output images include relevant images from the video data and the output further includes the confidence score.

18. The method of claim 17, further comprising annotating the output video data with one or more annotations.

19. The method of claim 18, wherein the one or more annotations include at least one of an indication of an amount of force and an indication of a point of contact.

* * * * *